US012669448B2

(12) United States Patent
Ikeda et al.

(10) Patent No.: US 12,669,448 B2
(45) Date of Patent: Jun. 30, 2026

(54) X-RAY INSPECTION APPARATUS

(71) Applicant: ISHIDA CO., LTD., Kyoto (JP)

(72) Inventors: Shinya Ikeda, Ritto (JP); Kazuyuki Sugimoto, Ritto (JP); Shinya Yamamoto, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 19/064,937

(22) Filed: Feb. 27, 2025

(65) Prior Publication Data

US 2025/0277756 A1     Sep. 4, 2025

(30) Foreign Application Priority Data

Mar. 1, 2024     (JP) ................................. 2024-031117

(51) Int. Cl.
| | |
|---|---|
| *G01N 23/04* | (2018.01) |
| *B07C 5/34* | (2006.01) |
| *G01N 23/083* | (2018.01) |
| *G01N 23/18* | (2018.01) |
| *G06T 7/00* | (2017.01) |

(52) U.S. Cl.
CPC .......... *G01N 23/04* (2013.01); *B07C 5/3416* (2013.01); *G01N 23/083* (2013.01); *G01N 23/18* (2013.01); *G06T 7/0004* (2013.01); *G01N 2223/401* (2013.01); *G01N 2223/643* (2013.01); *G06T 2207/10116* (2013.01); *G06T 2207/30108* (2013.01)

(58) Field of Classification Search
CPC ...... G01N 23/04; G01N 23/083; G01N 23/18; B07C 5/34; B07C 5/3416
USPC ....................................................... 209/589
See application file for complete search history.

(56) References Cited

U.S. PATENT DOCUMENTS

| | | | | |
|---|---|---|---|---|
| 2004/0151362 A1 * | 8/2004 | Hamaguchi | .......... | G06T 7/0002 |
| | | | | 382/145 |
| 2021/0004994 A1 | 1/2021 | Kubo | | |
| 2021/0063323 A1 | 3/2021 | Nakatani et al. | | |

FOREIGN PATENT DOCUMENTS

| | | | | | |
|---|---|---|---|---|---|
| EP | 4563988 A1 * | 6/2025 | .............. | G06N 3/08 |
| FR | 3126779 A1 | 3/2023 | | |
| JP | 2000171218 A * | 6/2000 | | |
| JP | 2000227311 A * | 8/2000 | | |
| JP | 2005-003481 A | 1/2005 | | |
| JP | 2008070330 A * | 3/2008 | | |
| JP | 4317566 B2 * | 8/2009 | ............ | G01N 23/04 |

(Continued)

OTHER PUBLICATIONS

Extended Search Report in the corresponding European Patent Application No. 25160493.0 dated Jun. 26, 2025.

*Primary Examiner* — Terrell H Matthews

(74) *Attorney, Agent, or Firm* — Spencer Fane LLP

(57)     ABSTRACT

An X-ray inspection apparatus includes a transport unit that transports an article; an irradiation unit that irradiates the article, which is transported by the transport unit, with X-rays; a sensor unit that detects the X-rays; and a control unit that generates an inspection image including the article from a detection result of the X-rays by the sensor unit, and that inspects whether the article includes an abnormality, based on the inspection image. The control unit generates a pseudo-defect image including a virtual abnormality by changing pixel values of some pixels constituting the inspection image generated when the article is inspected, and checks validity of the inspection based on the pseudo-defect image.

7 Claims, 7 Drawing Sheets

(56)                    References Cited

FOREIGN PATENT DOCUMENTS

| JP | 2021-167825 | A | | 10/2021 | |
|----|-------------|---|---|---------|---|
| KR | 20150095053 | A | * | 8/2015 | ............ G06F 11/008 |
| KR | 20200134364 | A | * | 12/2020 | .............. G01D 5/00 |
| WO | 2021/150889 | A1 | | 7/2021 | |
| WO | 2023/037078 | A1 | | 3/2023 | |

* cited by examiner

X-RAY INSPECTION APPARATUS

TECHNICAL FIELD

One aspect of the present invention relates to an X-ray inspection apparatus.

BACKGROUND

There is known an X-ray inspection apparatus including a conveying unit that conveys an article; an irradiation unit that irradiates the article, which is conveyed by the conveying unit, with X-rays; a sensor that detects the X-rays that have transmitted through the article; and a control unit that generates an inspection image (X-ray transmission image) from the X-rays detected by the sensor, and that performs the inspection of the article based on the inspection image (for example, Patent Document 1: JP 2005-3481 A). At a production site where such X-ray inspection apparatus is used, during normal operation of a production line, the validity of the inspection may be checked by randomly running a test piece through the production line, and confirming whether the target foreign object can be normally detected by the X-ray inspection apparatus.

However, preparing an article sample to which a test piece is affixed and checking the validity of the inspection by running the article sample through the production line places a heavy workload on a worker. In addition, since the inspection is performed during the production of the article, there is a risk of the article sample getting through. Furthermore, there is also a similar risk in a case where other kinds of inspection of shape abnormality, number of units and the like is performed during production.

SUMMARY

Therefore, an object of one aspect of the present invention is to provide an X-ray inspection apparatus capable of reducing the risk of an article sample getting through while reducing the workload of a worker even when the validity of an inspection is checked during production of the article.

(1) An X-ray inspection apparatus according to one aspect of the present invention includes a conveying unit configured to convey an article; an irradiation unit configured to irradiate the article conveyed by the conveying unit with X-rays; a sensor unit configured to detect the X-rays; and a control unit configured to generate an inspection image including the article from a detection result of the X-rays in the sensor unit, and configured to inspect whether the article includes an abnormality based on the inspection image, wherein the control unit generates a pseudo-defect image including a virtual abnormality by changing pixel values of some pixels constituting the inspection image generated when the article is inspected and checks validity of an inspection based on the pseudo-defect image.

In this configuration, the validity of the inspection is checked using the pseudo-defect image generated from the inspection image during inspection, without using an article sample. Accordingly, it is possible to reduce the risk of the article sample getting through while reducing the workload of a worker even when the validity of the inspection is checked during production of the article.

(2) In the X-ray inspection apparatus according to the above (1), the control unit may generate the pseudo-defect image when a time set in advance has elapsed or when the articles, the number of which is set in advance, are inspected, and automatically execute the checking. In this configuration, the checking of the validity of the inspection is automatically executed according to rules set in advance. Accordingly, the burden on the worker can be reduced.

(3) In the X-ray inspection apparatus according to the above (1), the control unit may extract an outline of the article included in the inspection image, and generate the pseudo-defect image by changing the pixel values of some of the pixels inside the extracted outline. In this configuration, the pseudo-defect image generated by the control unit becomes an image similar to the inspection image acquired when the abnormality has occurred in the article produced on a production line. Accordingly, the validity of the inspection is checked based on the inspection image that is actually acquired when the abnormality has occurred in the article produced on the production line, so that the accuracy of checking can be improved.

(4) In the X-ray inspection apparatus according to any one of the above (1) to (3), the control unit may generate the pseudo-defect image including a foreign object in the article, and when an inspection result indicating that the foreign object is not included is obtained from the inspection based on the inspection image, the control unit may determine that there is a problem with the validity of the inspection. In this configuration, an anomaly in which it is determined that the foreign object is not included, but originally should have determined that the foreign object is included, can be detected.

(5) In the X-ray inspection apparatus according to any one of the above (1) to (3), the control unit generates the pseudo-defect image including a foreign object in the article, when an inspection result indicating that the foreign object is included is obtained from the inspection based on the inspection image, the control unit may control a sorting unit to sort the article in a direction different from a direction in which the article that is normal and does not include the foreign object is conveyed in the conveying unit, and when an inspection result indicating that the foreign object is not included is obtained from the inspection based on the pseudo-defect image, the control unit may stop the conveying of the article by the conveying unit. In this configuration, the article determined as including the foreign object can be made distinct from normal products, and can be discharged to the outside of the system. In addition, in this configuration, when it is determined that the inspection is not correctly performed, the conveying by the conveying unit is stopped, so that the article including the foreign object can be prevented from being treated as a normal product after inspection.

(6) In the X-ray inspection apparatus according to any one of the above (1) to (3), the control unit may generate the pseudo-defect image including an abnormality in a shape of the article, and when an inspection result indicating that the abnormality in the shape of the article is not included is obtained from the inspection based on the pseudo-defect image, the control unit may determine that there is a problem with the validity of the inspection. In this configuration, an anomaly in which it is determined that the abnormality in shape is not present, but originally should have determined that the abnormality in shape is present, can be detected.

(7) In the X-ray inspection apparatus according to any one of the above (1) to (3), the article may include a plurality of constituents, the control unit may generate the pseudo-defect image including an abnormality in a shape of at least one of the plurality of constituents, and when an inspection result indicating that the abnormality in the shape of the at least one of the plurality of constituents is not included is obtained from the inspection based on the pseudo-defect image, the control unit may determine that there is a problem with the validity of the inspection. In this configuration, an anomaly in which it is determined that the abnormality in shape in the at least one of the plurality of constituents included in the article is not present, but originally should have determined that the abnormality in shape is present, can be detected.

According to one aspect of the present invention, it is possible to reduce the risk of an article sample getting through while reducing the workload of the worker even when the validity of the inspection is checked during production of the article.

DETAILED DESCRIPTION

Hereinafter, an X-ray inspection apparatus 1 according to one embodiment will be described with reference to the drawings. In the description of the drawings, the same elements are denoted by the same reference signs, and duplicated descriptions will be omitted.

Figure 1:
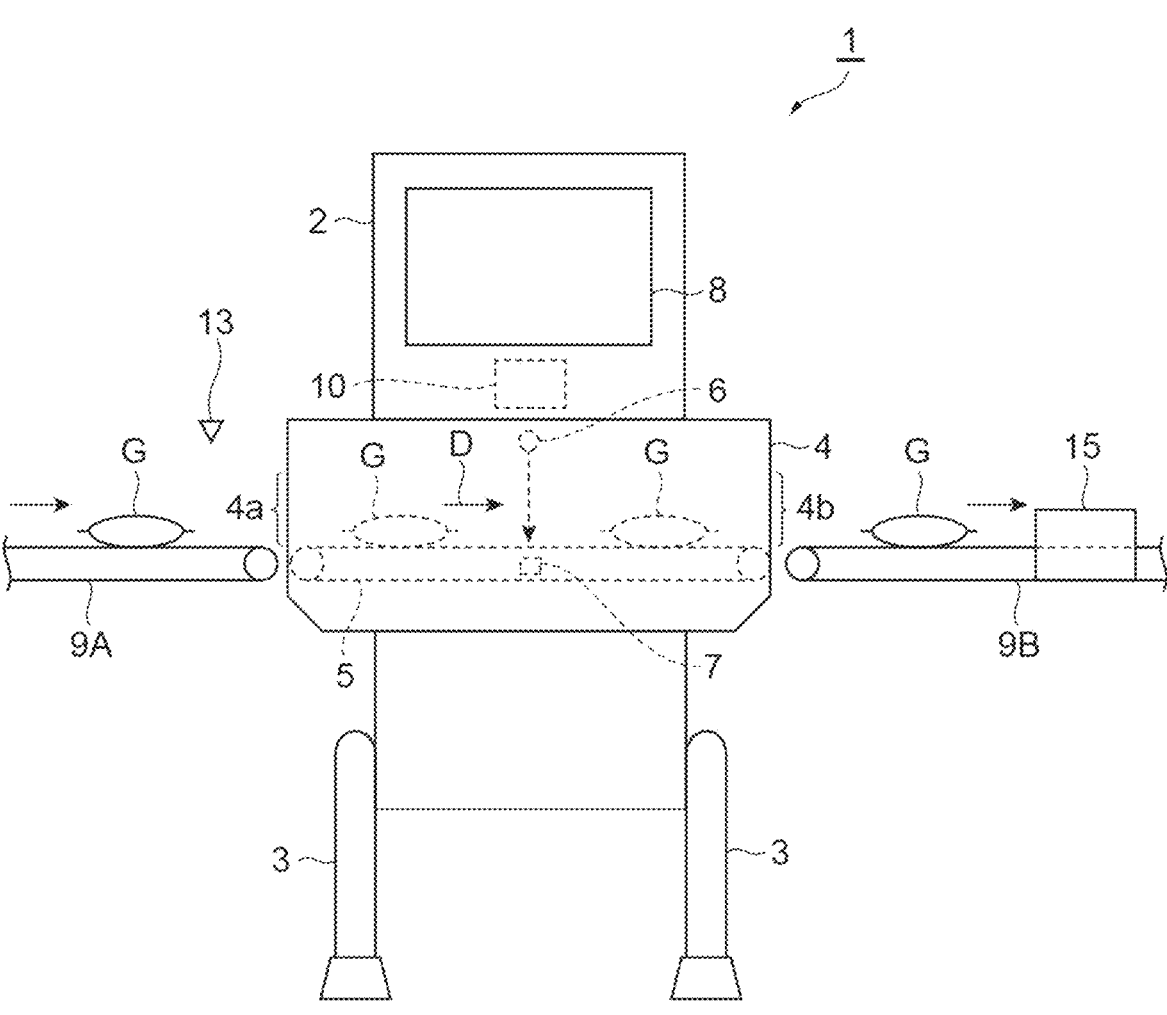
FIG. 1 is a configuration view of an X-ray inspection apparatus according to one embodiment.
Figure 2:
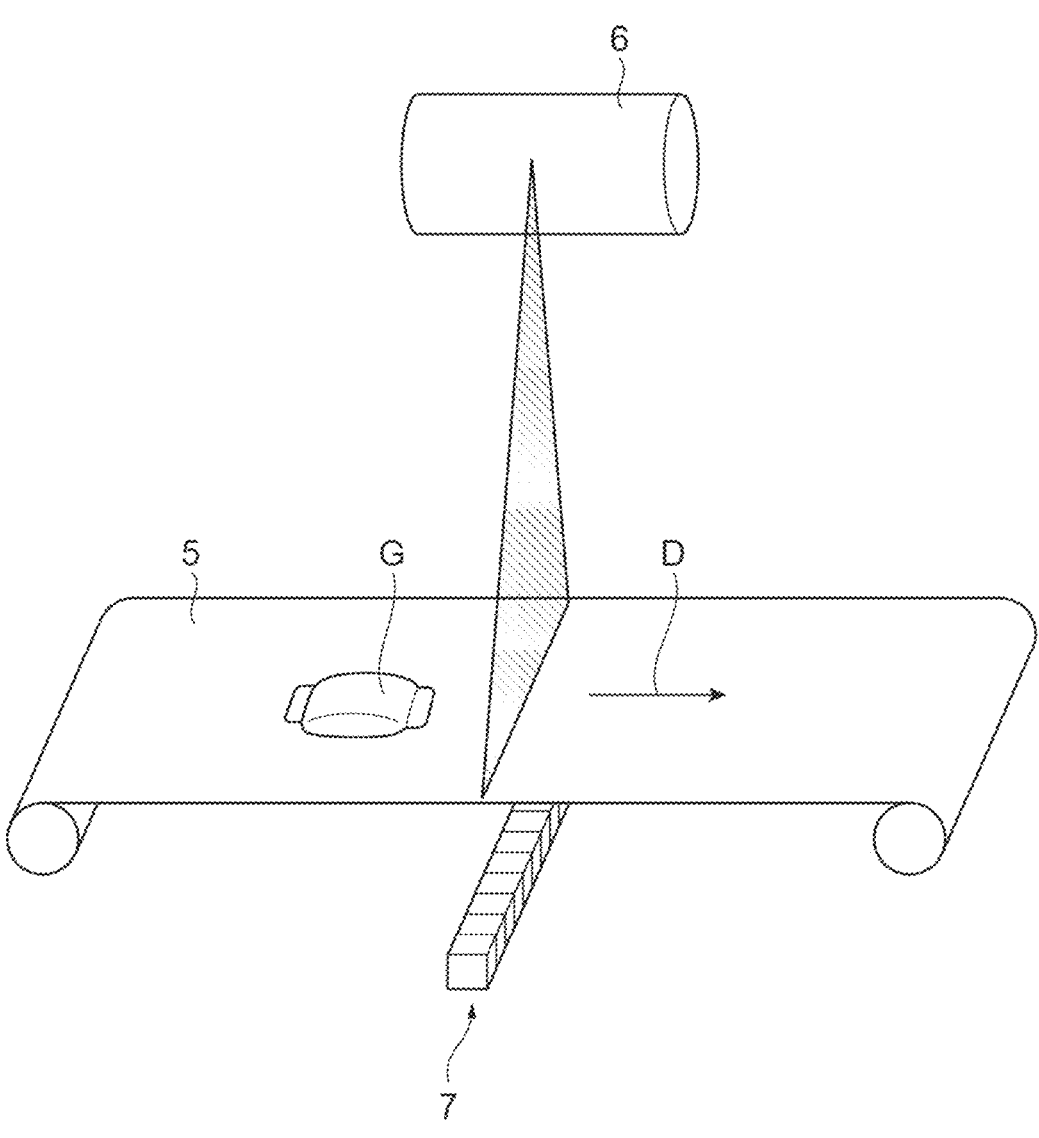
FIG. 2 is an internal configuration view of a shield box shown in FIG. 1.
Figure 3:
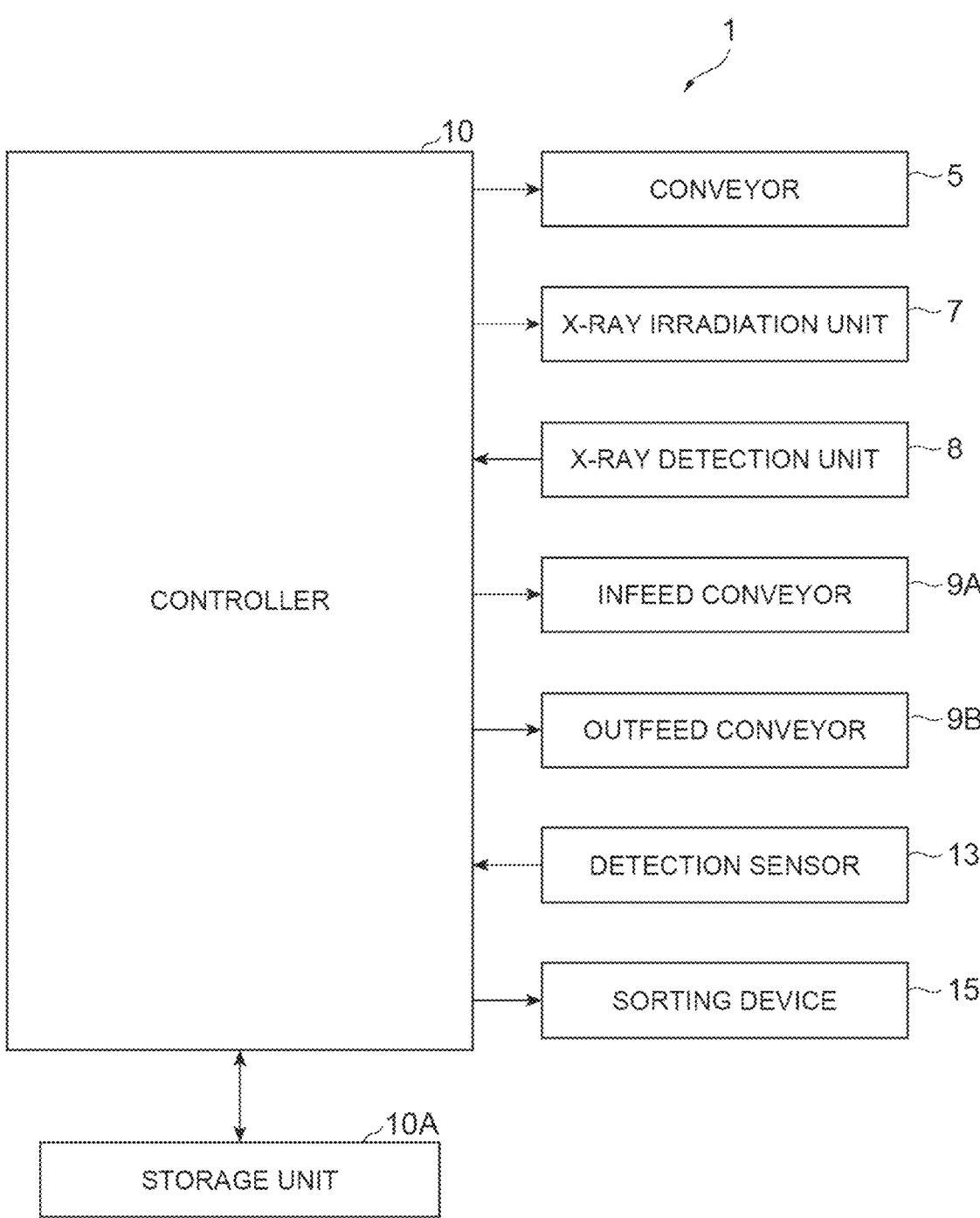
FIG. 3 is a block diagram showing a functional configuration of the X-ray inspection apparatus of FIG. 1.

As shown in FIGS. 1 to 3, the X-ray inspection apparatus 1 includes an apparatus main body 2, support legs 3, a shield box 4, a conveyor 5, an X-ray irradiation unit 6, an X-ray detection unit (sensor unit) 7, a display 8, a controller (control unit) 10, and a storage unit 10A. The X-ray inspection apparatus 1 acquires an inspection image IM of an article G while conveying the article G, and performs a foreign object contamination inspection on the article G based on the inspection image IM.

The article G before inspection is fed into the X-ray inspection apparatus 1 by an infeed conveyor 9A, and the article G after inspection is fed out from the X-ray inspection apparatus 1 by an outfeed conveyor 9B. The article G determined as being a defective product by the X-ray inspection apparatus 1 is sorted out of a production line (out of the system) by a sorting device (sorting unit) 15 disposed downstream of the outfeed conveyor 9B, and the article G determined as being a non-defective product by the X-ray inspection apparatus 1 passes through the sorting device as is.

The apparatus main body 2 accommodates the controller 10 and the like. The support legs 3 support the apparatus main body 2. The shield box 4 is provided in the apparatus main body 2, and prevents leakage of X-rays. An infeed opening 4a and an outfeed opening 4b are formed in the shield box 4. The article G before inspection is fed into the shield box 4 from the infeed conveyor 9A via the infeed opening 4a, and the article G after inspection is fed out to the outfeed conveyor 9B from the shield box 4 via the outfeed opening 4b. Each of the infeed opening 4a and the outfeed opening 4b is provided with an X-ray shield curtain (not shown) that prevents leakage of X-rays. A detection sensor 13 detects the article G conveyed by the infeed conveyor 9A. The detection result from the detection sensor 13 is acquired by the controller 10.

The conveyor 5 is disposed inside the shield box 4, and conveys the article G along a conveying direction D from the infeed opening 4a to the outfeed opening 4b. The conveyor 5 is, for example, a belt conveyor stretched between the infeed opening 4a and the outfeed opening 4b. The X-ray irradiation unit 6 is disposed inside the shielding box 4, and irradiates the article G, which is conveyed by the conveyor 5, by X-rays. Irradiation with X-rays by the X-ray irradiation unit 6 is controlled by the controller 10.

The X-ray detection unit 7 is disposed inside the shield box 4, and detects X-rays that are irradiated from the X-ray irradiation unit 6 and that transmit through the article G and the conveyor 5. The X-ray detection unit 7 is configured as, for example, a line sensor. Specifically, the X-ray detection unit 7 includes a plurality of photodiodes arranged one-dimensionally along a horizontal direction perpendicular to the conveying direction D, and a scintillator disposed on an X-ray incident side of each of the photodiodes. In this case, in the X-ray detection unit 7, X-rays that are incident on the scintillator are converted into light, and the light that is incident on each of the photodiodes is converted into an electrical signal. The electrical signal detected by the X-ray detection unit 7 is acquired by the controller 10.

The display 8 is provided in the apparatus main body 2. The display 8 includes a display screen serving as a touch panel and a speaker. The display 8 functions as an operation input unit that receives input of various conditions via the display screen. The display 8 functions as a display unit that displays inspection results and the like of the X-ray inspection apparatus 1 via the display screen.

The controller 10 is disposed inside the apparatus main body 2, and controls operation of each part of the X-ray inspection apparatus 1. The controller 10 includes a processor such as a central processing unit (CPU), memory such as a read only memory (ROM) and a random access memory (RAM), and a storage such as a solid state drive (SSD). A program for controlling the X-ray inspection apparatus 1 is recorded in the ROM. The controller 10 can be configured as, for example, software in the program stored in the ROM is loaded onto the RAM and executed by the CPU. The controller 10 may be configured as hardware such as an electronic circuit. The storage unit 10A is composed of one or a plurality of a hard disk drive (HDD), a flash memory, and the like. The storage unit 10A may be provided inside the apparatus main body 2, or may be provided to be able to communicate with the controller 10 via a network.

Figure 5A:
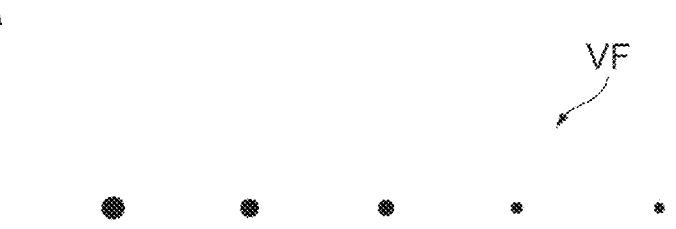
FIG. 5A is one example of a virtual foreign object image.
Figure 5B:
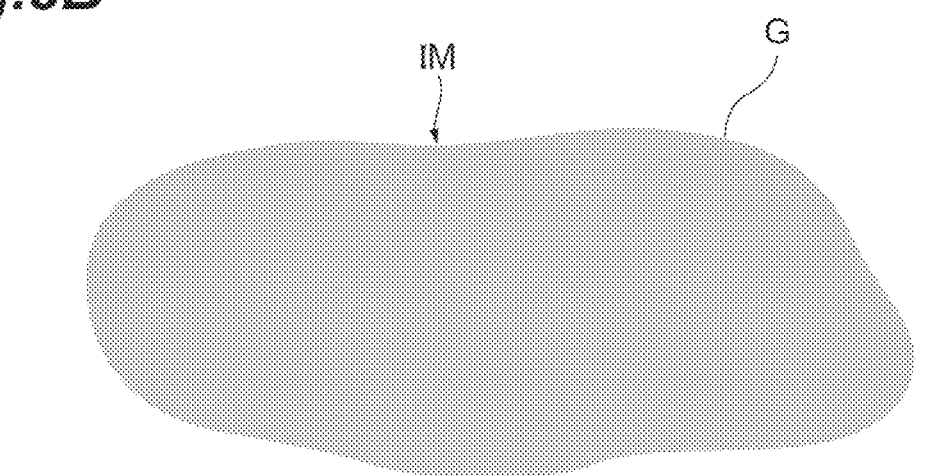
FIG. 5B is one example of an inspection image.
Figure 5C:
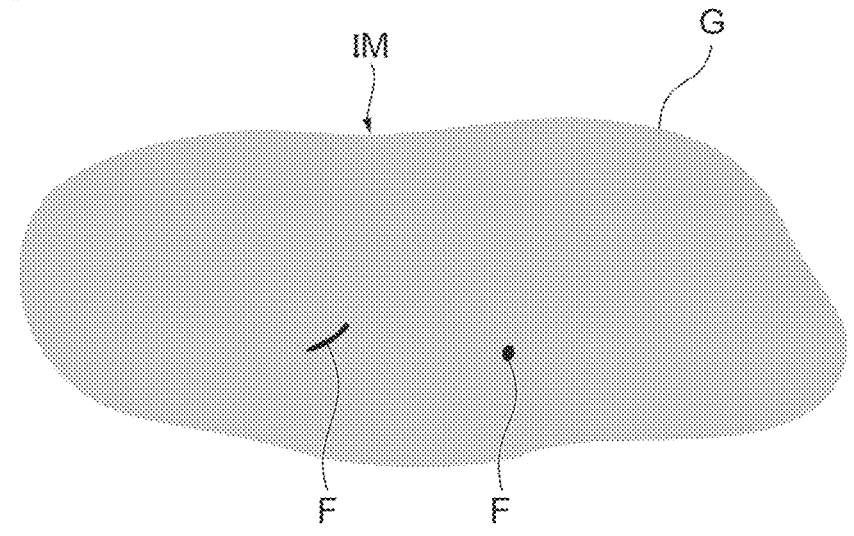
FIG. 5C is one example of an inspection image.

The controller 10 generates, for example, the inspection image IM including the article G from the X-ray detection result in the X-ray detection unit 7 as shown in FIG. 5B. In addition, the controller 10 generates, for example, the inspection image IM including the article G including a foreign object F from the X-ray detection result in the X-ray detection unit 7 as shown in FIG. 5C. The controller 10 inspects whether the article G includes the foreign object F, based on the inspection image IM.

Figure 6A:
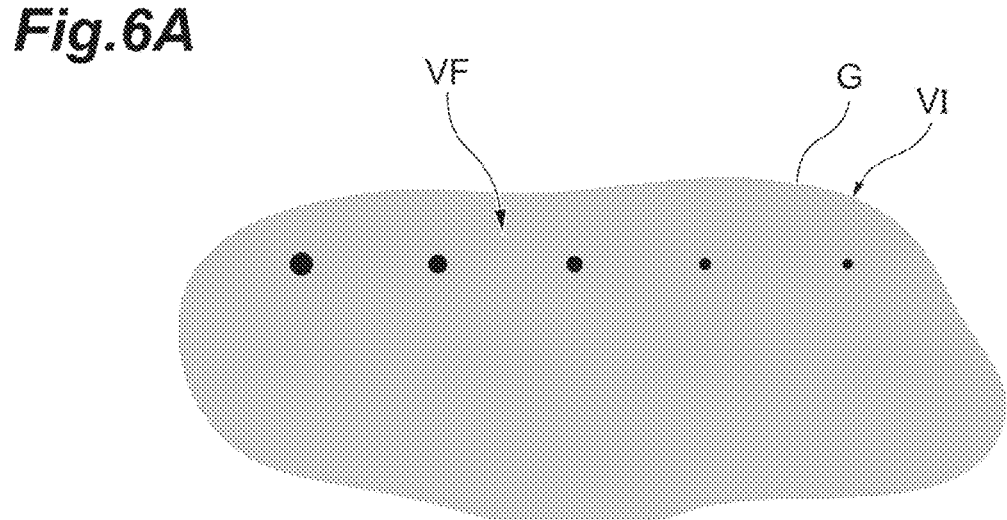
FIG. 6A is one example of a pseudo-defect image.
Figure 6B:
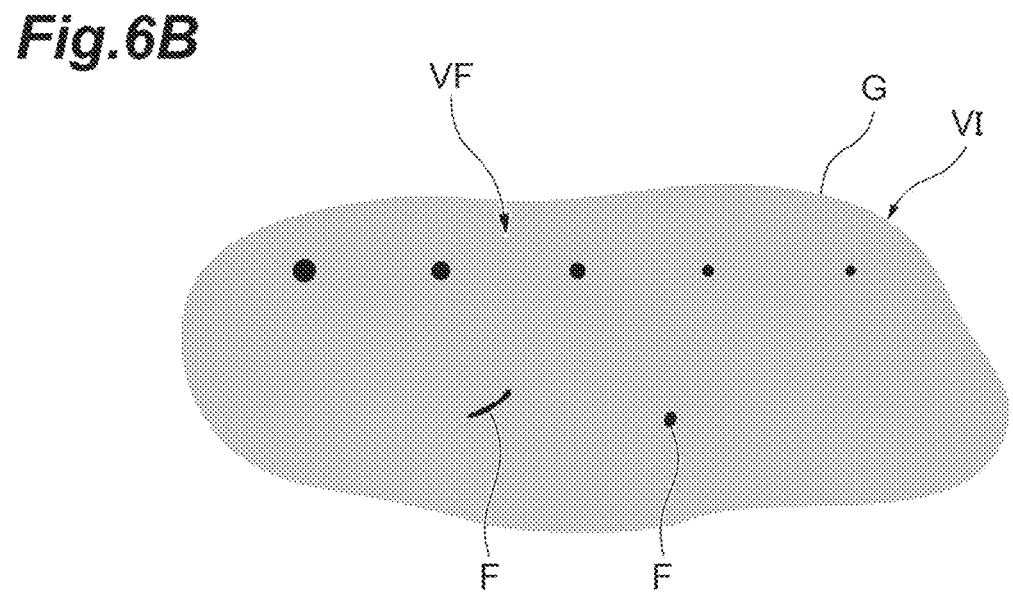
FIG. 6B is one example of a pseudo-defect image generated based on an inspection image including a foreign object.

The controller 10 of the present embodiment generates, for example, a pseudo-defect image VI as shown in FIG. 6A or 6B, which includes, for example, a virtual foreign object VF as shown in FIG. 5A, by changing the pixel values of some pixels constituting the inspection image IM generated during the inspection of the article G. The controller 10 acquires the inspection image IM of the article G conveyed from an upstream side, and extracts the outline of the article G. The outline of the article G can be extracted by a known method such as binarization, sharpening, or pattern matching.

The controller 10 generates, for example, the pseudo-defect image VI including the virtual foreign object VF as shown in FIG. 6A or 6B by changing the pixel values of some pixels inside the outline acquired in such a manner. FIG. 6A shows the pseudo-defect image VI in which the virtual foreign object VF is included in the inspection image IM of the article G that does not include the foreign object F. FIG. 6B shows the pseudo-defect image VI in which the virtual foreign object VF is included in the inspection image IM of the article G including the foreign object F.

The controller 10 checks the validity of the inspection based on the pseudo-defect image VI formed in such a manner. "Checking the validity of the inspection" here refers to, for example, confirming whether the foreign object F specified based on one or a plurality of articles from among the elements of the foreign object F which are specified by size, thickness, material, and the like can be detected. The elements that have to be confirmed (in other words, required performance) are configured to be settable via the display 8. The controller 10 determines whether a predetermined required performance is satisfied, based on the pseudo-defect image VI.

The changed values determining the extent to which the pixel values of some of the pixels described above are changed according to the required performance when the pseudo-defect image VI is generated is stored in the storage unit 10A. In addition, the changed values determining the extent to which the pixel values of some of the pixels described above are changed are set based on an acquired inspection image of the foreign object F that is assumed. The storage unit 10A may store a plurality of foreign object patterns, each of which specifies the number and shape of pixels to be changed, assuming a plurality of the foreign objects F. For example, the foreign object F having a round shape, the foreign object F having an elongated shape, and the like can be considered as the foreign object patterns. The controller 10 may be configured such that what foreign object pattern of the foreign object F is used as the basis for generating the pseudo-defect image VI can be set.

The controller 10 generates the pseudo-defect image VI and automatically executes checking when a time set in advance (for example, one hour) has elapsed since the production of the article G is started (since the inspection is started) or when the articles G, the number of which is set in advance (for example, 1000 pieces), are inspected. In other words, the controller 10 executes a normal inspection to inspect whether the article G includes the foreign object F, based on the inspection image IM until the time set in advance (for example, one hour) has elapsed since the production of the article G is started, or until the articles G, the number of which is set in advance (for example, 1000 pieces), have passed through the X-ray inspection apparatus 1.

The controller 10 generates the pseudo-defect image VI for the first time when the time set in advance (for example, one hour) has elapsed since the production of the article G is started or when the articles G, the number of which is set in advance (for example, 1000 pieces) have passed through the X-ray inspection apparatus 1. The controller 10 inspects whether the article G includes the foreign object F, based on the pseudo-defect image VI that is automatically generated at such timing. Namely, the X-ray inspection apparatus 1 checks the validity of the inspection according to a schedule set in advance. When an inspection result indicating that the foreign object F is not included is obtained from the inspection based on the pseudo-defect image VI, the controller 10 determines that there is a problem with the validity of the inspection, and when an inspection result indicating that the foreign object F is included is obtained from the inspection based on the pseudo-defect image VI, the controller 10 determines that there is no problem with the validity of the inspection. In such a manner, the controller 10 checks the validity of the inspection based on the pseudo-defect image VI.

The controller 10 controls the sorting of the sorting device 15 disposed downstream of the X-ray inspection apparatus 1. In the above-described normal inspection, when it is determined that the article G is normal (the foreign object F is not included), the controller 10 does not activate the sorting device 15, and conveys the article G, which is conveyed by the outfeed conveyor 9B, downstream. In the above-described normal inspection, when it is determined that the article G is abnormal (the foreign object F is included), the controller 10 activates the sorting device 15 to sort the article G out of the production line (in a direction different from the conveying direction in the conveying unit).

Examples of the sorting device 15 include an arm type sorting device using an arm, a drop-up belt type sorting device, a pusher type sorting device using a pusher device, a drop flap type sorting device, an air jet type sorting device, a fin type sorting device, and the like.

In the checking of the validity of the inspection based on the pseudo-defect image VI described above, when an inspection result indicating that the foreign object F is not included is obtained, in other words, when it is determined that there is a problem with the validity of the inspection, the controller 10 stops the conveying of the articles G by the infeed conveyor 9A, the conveyor 5, and the outfeed conveyor 9B. Namely, in this case, the controller 10 determines that the current inspection by the X-ray inspection apparatus 1 does not satisfy the predetermined required performance, and stops the operation of the production line. The controller 10 may notify a worker or the like that there is a problem with the check result of the validity of the inspection, for example, by displaying the check result on the display 8.

Figure 4:
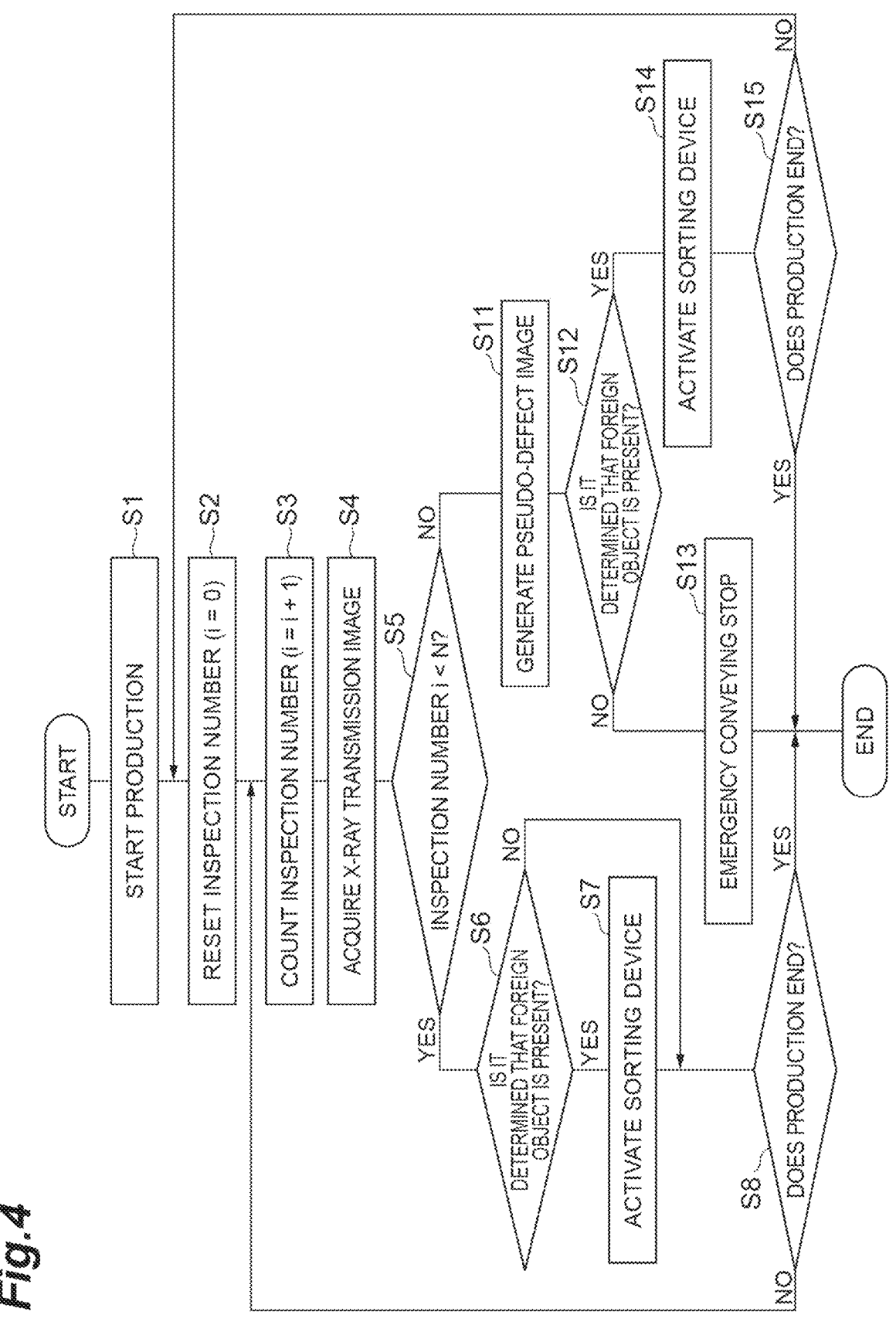
FIG. 4 is a flowchart showing the operation of the X-ray inspection apparatus according to one embodiment.

Next, the operation of the X-ray inspection apparatus 1 when the articles G are produced will be described mainly with reference to FIG. 4. As shown in FIG. 4, when the production of the article G is started (step S1), the controller 10 resets a counter that counts an inspection number (step S2). The controller 10 counts the articles G conveyed to the X-ray inspection apparatus 1 (step S3). The controller 10 counts the articles G based on the detection results of the detection sensor 13 that detects the articles G flowing on the infeed conveyor 9A. The X-ray inspection apparatus 1 acquires the inspection images (X-ray transmission images) IM of the conveyed articles G (step S4). The controller 10 confirms the inspection number when the inspection images IM are acquired (step S5).

When it is confirmed that an inspection number i is smaller than a predetermined number N (for example, N=1000) (step S5: YES), the controller 10 executes a normal inspection to inspect whether the article G includes the foreign object F, based on the inspection image IM (step S6).

Here, when it is determined that the article G does not include the foreign object F, in the result of the normal inspection based on the inspection image IM (step S6: YES), the controller 10 activates the sorting device 15 (step S7) to discharge the article G to the outside of the system. Namely, the sorting device 15 prevents the article G including the foreign object F from being conveyed downstream of the outfeed conveyor 9B. In addition, when it is determined that the article G does not include the foreign object F, in the result of the normal inspection based on the inspection image IM (step S6: NO), the controller 10 causes the article G to be conveyed downstream of the outfeed conveyor 9B without activating the sorting device 15.

Thereafter, the controller 10 determines whether the production of the article G has ended (step S8), and when it is determined that the production of the article G has ended (step S8: YES), the controller 10 ends a series of processes. Accordingly, the series of processes in the X-ray inspection apparatus 1 are ended. The end of production of the article G here is determined, for example, by whether the number of the articles G produced in one day is reached. When it is determined that the production of the article G has not ended (step S8: NO), the controller 10 returns to step S3, and increments the inspection number i by one. Thereafter, the controller 10 executes step S4 and the subsequent steps.

When it is confirmed that the inspection number i is equal to or larger than the predetermined number N (for example, N=1000) (step S5: NO), the controller 10 generates the pseudo-defect image VI (step S11). The method for generating the pseudo-defect image VI is as described above. The controller 10 inspects whether the article G includes the foreign object F, based on the pseudo-defect image VI, and checks the validity of the inspection (step S12). Here, in the checking of the validity of the inspection based on the pseudo-defect image VI, when it is determined that the article G does not include the foreign object F (step S12: NO), the controller 10 stops the conveying of the articles G by the infeed conveyor 9A, the conveyor 5, and the outfeed conveyor 9B (step S13). Accordingly, the series of processes in the X-ray inspection apparatus 1 are ended. In addition, in the checking of the validity of the inspection based on the pseudo-defect image VI, when it is determined that the article G includes the foreign object F (step S12: YES), the controller 10 activates the sorting device 15 to discharge the article G to the outside of the system (step S14). Namely, the sorting device 15 prevents the article G including the foreign object F from being conveyed downstream of the outfeed conveyor 9B.

Thereafter, the controller 10 determines whether the production of the article G has ended (step S15), and when it is determined that the production of the article G has ended (step S15: YES), the controller 10 ends a series of processes in the X-ray inspection apparatus 1. When it is determined that the production of the article G has not ended (step S15: NO), the controller 10 returns to step S2, resets the inspection number once, and then increments the inspection number i by one (step S3). Thereafter, the controller 10 repeats step S4 and the subsequent steps.

Actions and effects of the X-ray inspection apparatus 1 of the above-described embodiment will be described. In the X-ray inspection apparatus 1 of the above-described embodiment, the validity of the inspection is checked using the pseudo-defect image VI generated from the inspection image normally acquired during inspection, without using a sample to which a test piece is affixed. Accordingly, it is possible to reduce the risk of the foreign object F contaminating the article G while reducing the workload of the worker even when the validity of the inspection is checked during production of the article G.

In the X-ray inspection apparatus 1 of the above-described embodiment, when an inspection result indicating that the foreign object F is not included is obtained from the inspection based on the pseudo-defect image VI, the controller 10 determines that there is a problem with the validity of the inspection. Accordingly, an anomaly in which it is determined that the foreign object F is not present, but originally should have determined that the foreign object F is present, namely, that the inspection being currently performed does not satisfy the desired required performance, can be detected.

In the X-ray inspection apparatus 1 of the above-described embodiment, the controller 10 generates the pseudo-defect image VI when the time set in advance has elapsed or when the articles G, the number of which is set in advance, are inspected, and automatically executes checking. Accordingly, the validity of the inspection is automatically checked according to rules set in advance. As a result, the burden on the worker can be reduced.

In the X-ray inspection apparatus 1 of the above-described embodiment, the controller 10 generates the pseudo-defect image VI by extracting the outline of the article G included in the inspection image IM, and changing the pixel values of some pixels inside the extracted outline. Accordingly, the pseudo-defect image VI generated by the controller 10 becomes an image similar to the inspection image IM acquired when the foreign object F contaminates the article G produced on the production line. As a result, the validity of the inspection is checked based on the inspection image IM that is actually acquired when the foreign object F contaminates the article G produced on the production line, so that the accuracy of checking can be improved.

In the X-ray inspection apparatus 1 of the above-described embodiment, when an inspection result indicating that the foreign object F is included is obtained from the inspection based on the inspection image IM, the controller 10 controls the sorting device 15 to sort the article G in a direction different from the direction in which the article G that is normal and does not include the foreign object F is conveyed on the outfeed conveyor 9B, and when an inspection result indicating that the foreign object F is not included is obtained from the inspection based on the pseudo-defect image VI, the controller 10 stops the conveying of the articles G by the infeed conveyor 9A, the conveyor 5, and the outfeed conveyor 9B. Accordingly, the article G determined as including the foreign object F can be made distinct from normal products, and can be discharged to the outside of the system. In addition, when it is determined that the inspection is not correctly performed, the conveying by the infeed conveyor 9A, the conveyor 5, and the outfeed conveyor 9B is stopped, so that the article G including the foreign object F can be prevented from being treated as a normal product after inspection.

One embodiment has been described above; however, one aspect of the present invention is not limited to the above-described embodiment. Various modifications can be made without departing from the concept of the invention.

Figure 7A:
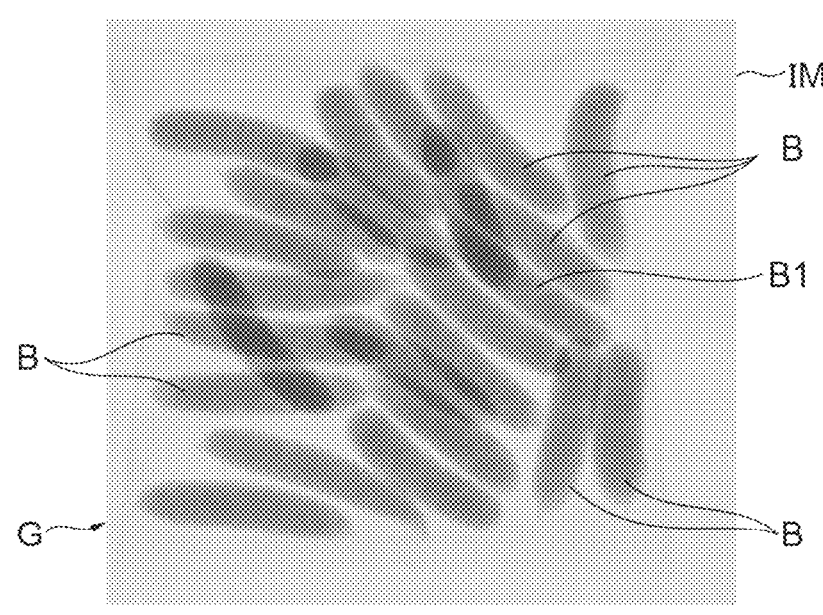
FIG. 7A is one example of an inspection image relating to a modification example.
Figure 7B:
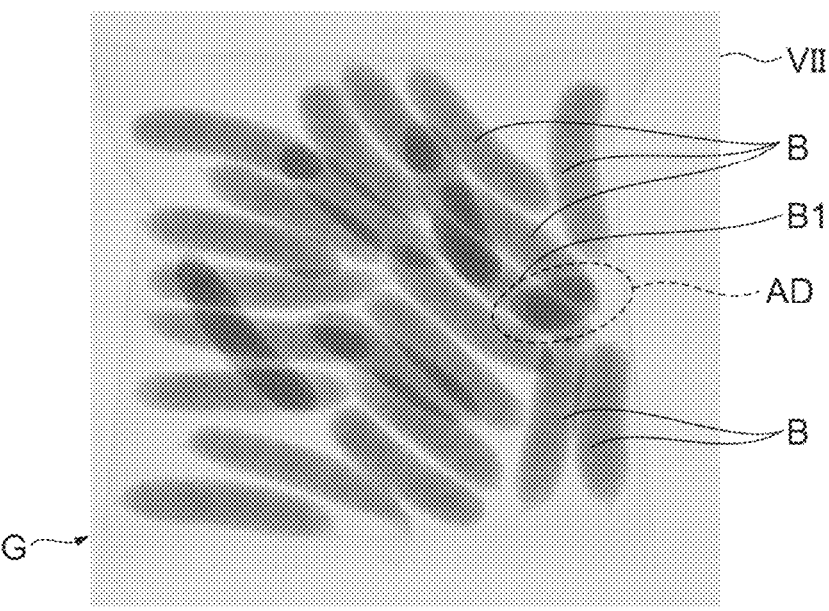
FIG. 7B is one example of a pseudo-defect image generated based on an inspection image including a shape abnormality portion.

The controller 10 of the X-ray inspection apparatus 1 of the above-described embodiment has been described by giving an example in which the pseudo-defect image VI including the foreign object F in the article G is generated as an example of a pseudo-defect image including a virtual abnormality, but, for example, a pseudo-defect image VII including an abnormality in the shape of the article G, such as that shown in FIG. 7B, may be generated. Furthermore, the X-ray inspection apparatus 1 of the above-described embodiment has been described by giving an example in which the controller 10 inspects whether or not the foreign object F is included in the article G based on the pseudo-defect image VI, but, for example, it may inspect whether or not an abnormality is included in the shape of the article G based on the pseudo-defect image VII. Hereinafter, an X-ray inspection apparatus 1 that inspects whether or not there are abnormal bends (folds) in an article G that extends in one direction, such as a wiener or sausage, is described as an inspection device that inspects whether or not an abnormality is included in the shape of the article G.

Similar to the above-described embodiment, the X-ray inspection apparatus 1 according to a modification example includes an apparatus main body 2, support legs 3, a shield box 4, a conveyor 5, an X-ray irradiation unit 6, an X-ray detection unit (sensor unit) 7, a display 8, a controller (control unit) 10, and a storage unit 10A. The X-ray inspection apparatus 1 acquires an inspection image IM (see FIG. 7A) of an article G, in which a plurality of constituents B that extend in one direction, such as wieners or sausages, are sealed in a bag, while conveying the article G, and inspects whether or not there are abnormal bends in the plurality of constituents B based on the inspection image IM.

The controller 10 generates an inspection image IM including an article G, such as that shown in FIG. 7A, for example, from a detection result of X-rays in the X-ray detection unit 7. The controller 10 inspects whether or not an abnormally-shaped portion AD is included (whether or not a bent portion is included) in the constituents B based on such an inspection image IM. The controller 10 inspects whether or not the abnormally-shaped portion AD is included in the constituents B based on such an inspection image IM, for example, by using a first learned model or a second learned model.

The storage 10A stores the first and second learned models used in inspecting whether or not the abnormally-shaped portion AD is included in the constituents B, as well as a program, algorithm or the like used to generate the first and second learned models. The first and second learned models are programs that are automatically set by machine learning. The first learned model is a model that has been learned based on a silhouette of an article in an X-ray transmission image. The second learned model is a model that has been learned based on ends of constituents B in an X-ray transmission image. The first and second learned models are models that are capable of performing semantic segmentation. Furthermore, the first and second learned models may be models capable of performing instance segmentation. Moreover, whether or not the abnormally-shaped portion AD is included in the constituents B may be determined by a publicly-known method such as pattern matching, for example, without using a learned model such as that described above.

The controller 10 generates a pseudo-defect image VII in which is included a virtual abnormal constituent B1 having an abnormally-shaped portion AD, such as that shown in FIG. 7B, for example, by changing the pixel values of some of the pixels constituting an inspection image IM generated during inspection of the article G. More specifically, the controller 10 acquires the inspection image IM of the article G that is conveyed from an upstream side, and extracts an outline of the plurality of constituents B included in the article G. The outline of the constituents B can be extracted by a publicly-known method such as binarization, sharpening and pattern matching, for example. The controller 10 generates the pseudo-defect image VII in which is included an abnormally-shaped portion AD such as that shown in FIG. 7B, for example, by changing the pixel values of some of the pixels including the outline acquired thereby. The abnormally-shaped portion AD is a portion in which the constituent B has bent end portions. The pseudo-defect image VII in which the abnormally-shaped portion AD is included may be shaped by attaching the image of the ends of the constituent B that has been prestored in the storage unit 10A, may be shaped by changing the outline based on a predefined pattern, and may be shaped by causing deformation so as to bend the ends using publicly-known image processing.

The controller 10 checks validity of an inspection based on the pseudo-defect image VII formed thereby. Here, "checking validity of an inspection" means confirming whether or not it has been correctly determined that the abnormally-shaped portion AD is included in the constituent B using the first learned model or the second learned model, for example.

The controller 10 generates the pseudo-defect image VII and automatically performs checking when a predetermined time has elapsed (e.g., 1 hour) after beginning production (after beginning inspection) of the article G, or when a predetermined number (e.g., 1000 units) of the article G has been inspected. In other words, the controller 10 performs normal inspection to inspect whether or not an abnormally-shaped portion AD (abnormal bend) is included in a constituent B based on the inspection image IM after beginning production of the article G and until a predetermined time has elapsed (e.g., 1 hour), or until a predetermined number (e.g., 1000 units) of the articles G have passed through the X-ray inspection apparatus 1.

The controller 10 first generates the pseudo-defect image VII when a predetermined time has elapsed (e.g., 1 hour) after beginning production (after beginning inspection) of the article G, or when a predetermined number (e.g., 1000 units) of the article G has passed through the X-ray inspection apparatus 1. The controller 10 inspects whether or not an abnormally-shaped portion AD is included in a constituent B included in the article G based on the pseudo-defect image VII that is automatically generated at such timing. That is, the X-ray inspection apparatus 1 checks validity of an inspection by a predetermined schedule. The controller 10 determines that there is a problem with the validity of the inspection upon obtaining an inspection result indicating that the abnormally-shaped portion AD is not included by the inspection based on the pseudo-defect image VII, and determines that there is not a problem with the validity of the inspection upon obtaining an inspection result indicating that the abnormally-shaped portion AD is included by the inspection based on the pseudo-defect image VII. In this manner, the controller 10 checks validity of the inspection based on the pseudo-defect image VII.

Furthermore, in the X-ray inspection apparatus 1 according to the above-described modification example, the modes of the control of the sorting device 15 based on the result of the inspection, and the control, notification and the like of the infeed conveyor 9A, the conveyor 5 and the outfeed conveyor 9B, are also similar to those of the above-described embodiment, and thus are omitted from the detailed description here.

Actions and effects of the X-ray inspection apparatus 1 of the above-described modification example will be described. Conventionally, in order to confirm validity of an inspection of whether or not there is an abnormally-shaped portion AD of a constituent B is present with an X-ray inspection apparatus, an abnormally-shaped constituent, such as a wiener with abnormal bends, was prepared, and the prepared abnormally-shaped constituent was run through the production line before beginning production of an article in which these constituents are included, or during production of the article. However, this work is labor intensive. Furthermore, constituents such as wieners degrade, and thus the abnormally-shaped constituents had to be prepared regularly in short periods, giving rise to a loss of products and to an increased workload for producing the abnormally-shaped constituents. Furthermore, there was also a risk with such inspection procedures of the abnormally-shaped constituents being mixed with the articles and getting through.

In this respect, the X-ray inspection apparatus 1 according to the above-described modification example checks validity of an inspection using a pseudo-defect image VII generated from an inspection image IM acquired normally during inspection, without using abnormally-shaped article samples such as wieners. This makes it possible to reduce the risk of a constituent B having an abnormally-shaped portion AD (article sample) contaminating an article G while reducing the workload on workers even when checking validity of an inspection during production of the article G.

The above-described modification example was described by giving an example of inspecting whether or not there are abnormal shapes for constituents B included in a bag, but it is also possible to inspect by a similar method when the constituent B is conveyed separately, that is, when the constituent B is conveyed separately as the article G.

The X-ray inspection apparatus 1 of the above-described embodiment and modification examples is described by giving an example in which a foreign object contamination inspection is performed to inspect whether or not a foreign object F is included in a constituent B, or a shape abnormality inspection is performed to inspect whether or not an abnormally-shaped portion AD is included in a constituent B, but one aspect of the present invention is not limited to cases in which these are applied to inspections. For example, one aspect of the present invention can also be applied to inspections for counting a number of pieces of deep-fried chicken, a number of pieces of diced solids such as hotpot cubes and the like, inspections for estimating a length, width and weight of a long article such as a wiener and the like, inspections for confirming whether or not main ingredients and garnishes included in a boxed lunch and the like are present, inspections for confirming whether or not bubbles included in a rubber sheet or the like are present, and so on.

In the description of the operation of the X-ray inspection apparatus 1 of the above-described embodiment and modification examples, a case in which the controller 10 determines whether to execute the validity of the inspection, based on the inspection number as shown in FIG. 4, has been described as an example; however, the present invention is not limited thereto. For example, the controller 10 may determine whether to execute the validity of the inspection, based on the elapsed time (for example, one hour) since the inspection is started. In other words, the controller 10 may execute the validity of the inspection at every predetermined elapsed time (for example, every hour). The configuration may be such that the inspection number and the elapsed time can be input by the worker via the display 8 or the like.

In the X-ray inspection apparatus 1 of the above-described embodiment and the above-described modification examples, when the pseudo-defect image VI is generated, a case in which, for example, the pseudo-defect image VI including the virtual foreign object VF as shown in FIG. 6A or 6B is generated by changing the pixel values of some of the pixels described above based on numerical values stored in the storage unit 10A has been described as an example; however, the present invention is not limited thereto. For example, an X-ray transmission image of the foreign object F acquired in advance may be stored in the storage unit 10A, and the controller 10 may generate the pseudo-defect image VI including the virtual foreign object VF by changing the pixel values of some of the pixels described above through combining the X-ray transmission image of the foreign object F acquired in advance with the inspection image IM of the article G.

In the X-ray inspection apparatus 1 of the above-described embodiment and the above-described modification examples, an example in which the sorting device 15 that sorts the article G to be conveyed downstream in the conveying direction on the outfeed conveyor 9B or to be discharged to the outside of the system is provided has been described; however, the present invention is not limited thereto. For example, in addition to the above-described out-of-system discharge, the sorting device 15 may perform a discharge to an outside of the system (hereinafter, also referred to as a "second out-of-system"), which is distinct from the above-described out-of-system discharge. Namely, the sorting device 15 of the present modification example may be configured to be able to sort the articles G, which are conveyed on the outfeed conveyor 9B, in three directions.

In this case, in the checking of the validity of the inspection based on the pseudo-defect image VI, when it is determined that the article G includes the foreign object F (step S12: YES), the controller 10 may activate the sorting device 15 to discharge the article G to an outside of the system (second out-of-system) separate from the outside of the system to which the article G determined as including the foreign object F in the normal inspection is discharged. Accordingly, even when the validity of the inspection is checked during production of the article G, the number of non-defective products and the number of defective products can be accurately managed in the production of the article G.

In the X-ray inspection apparatus 1 of the above-described embodiment and the above-described modification examples, a case in which the controller 10 generates the pseudo-defect image VI when the time set in advance has elapsed since the production of the article G is started (since the inspection is started) or when the articles G, the number of which is set in advance, are inspected, and automatically executes checking of the validity of the inspection has been described as an example; however, the present invention is not limited thereto. For example, the controller 10 may execute checking of the validity of the inspection in response to an instruction from the worker input via the display 8 or the like.

In the X-ray inspection apparatus 1 of the above-described embodiment and the above-described modification examples, a case in which the X-ray detection unit 7 is composed of one line sensor has been described as an example; however, the X-ray detection unit 7 may be configured as a multi-energy sensor composed of a first line sensor and a second line sensor having different detectable energy bands. In addition, the X-ray detection unit 7 may be able to detect X-rays using a photon counting method. The X-ray detection unit 7 may be a direct conversion detection unit or may be an indirect conversion detection unit. In addition, these sensors are arranged, for example, at least in a direction (width direction) orthogonal to the conveying direction and an up-down direction of the conveyor 5. The elements may be arranged not only in the width direction but also in the conveying direction. Namely, the X-ray detection unit 7 may include a line sensor, or may include a group of sensors disposed two-dimensionally. The sensor may be, for example, a photon detection sensor such as a CdTe semiconductor detector.

What is claimed is:

1. An X-ray inspection apparatus comprising:
a conveying unit configured to convey an article;
an irradiation unit configured to irradiate the article conveyed by the conveying unit with X-rays;
a sensor unit configured to detect the X-rays; and
a control unit configured to generate an inspection image including the article from a detection result of the X-rays in the sensor unit, and configured to inspect whether the article includes an abnormality based on the inspection image,
wherein the control unit generates a pseudo-defect image including a virtual abnormality by changing pixel values of some pixels constituting the inspection image generated when the article is inspected and checks validity of an inspection based on the pseudo-defect image,
the control unit extracts an outline of the article included in the inspection image and generates the pseudo-defect image by changing the pixel values of some of the pixels inside the extracted outline.

2. The X-ray inspection apparatus according to claim 1, wherein the control unit generates the pseudo-defect image when a time set in advance has elapsed or when a preset number of the articles is inspected and automatically executes a checking.

3. The X-ray inspection apparatus according to claim 1, wherein the control unit generates the pseudo-defect image including a foreign object in the article, and
the control unit determines that there is a problem with the validity of the inspection when an inspection result indicating that the foreign object is not included is obtained by the inspection based on the pseudo-defect image.

4. The X-ray inspection apparatus according to claim 1, wherein the control unit generates the pseudo-defect image including a foreign object in the article,
the control unit controls a sorting unit to sort in a direction different from a direction in which the article being normal and not including the foreign object is conveyed in the conveying unit when the inspection result indicating that the foreign object is included is obtained by the inspection based on the inspection image, and
the control unit stops conveying of the article by the conveying unit when an inspection result indicating that the foreign object is not included is obtained by the inspection based on the pseudo-defect image.

5. The X-ray inspection apparatus according to claim 1, wherein the control unit generates the pseudo-defect image including an abnormality in a shape of the article, and
the control unit determines that there is a problem with the validity of the inspection when an inspection result indicating that the abnormality in the shape of the article is not included is obtained by the inspection based on the pseudo-defect image.

6. The X-ray inspection apparatus according to claim 1, wherein the article includes a plurality of constituents,
the control unit generates the pseudo-defect image including an abnormality in a shape of at least one of the plurality of constituents, and
the control unit determines that there is a problem with the validity of the inspection when an inspection result indicating that the abnormality in the shape of the at least one of the plurality of constituents is not included is obtained by the inspection based on the pseudo-defect image.

7. The X-ray inspection apparatus according to claim 1, wherein the control unit is configured to generate the pseudo-defect image during a normal operation of a production line in which the article is inspected and sorted out if the article includes an abnormality.

* * * * *